Figure 3:
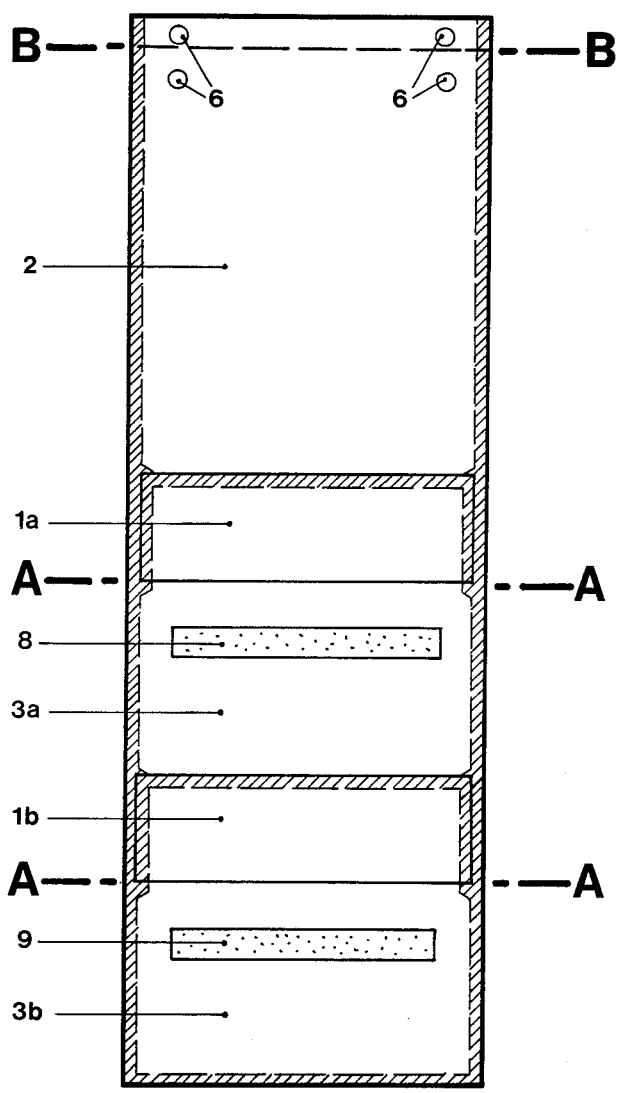

United States Patent [19]
Sharpe

[11] Patent Number: 4,564,452
[45] Date of Patent: Jan. 14, 1986

[54] APPARATUS FOR FILTRATION

[76] Inventor: Anthony N. Sharpe, 230 Christian St., (P.O. Box 1224), Almonte, Canada, K0A 1A0

[21] Appl. No.: 657,836

[22] Filed: Oct. 5, 1984

[30] Foreign Application Priority Data

Dec. 9, 1983 [CA] Canada .................................. 443000

[51] Int. Cl.$^4$ ............................................ B01D 25/04
[52] U.S. Cl. .................. 210/497.2; 210/489; 210/495; 426/77
[58] Field of Search ..................... 210/497.2, 483, 489, 210/495; 426/77

[56] References Cited

U.S. PATENT DOCUMENTS

| 2,282,301 | 5/1942 | Petersen | 210/483 |
| 3,352,226 | 11/1967 | Nelsen | 426/79 |
| 3,372,634 | 3/1968 | Brinkman et al. | 426/77 |
| 3,419,151 | 12/1968 | Smith et al. | 210/489 |
| 3,615,708 | 10/1971 | Abile-Gal | 426/77 |
| 3,651,947 | 3/1972 | Schollhamer | 210/489 |
| 3,762,564 | 10/1973 | Weedon et al. | 210/497.2 |
| 3,861,975 | 1/1975 | Hauslein | 210/497.2 |
| 4,035,304 | 7/1977 | Watanabe | 210/495 |
| 4,115,277 | 9/1978 | Swank | 210/489 |

FOREIGN PATENT DOCUMENTS 2121762  1/1984  United Kingdom .................. 426/77

Primary Examiner—Tim Miles

[57] ABSTRACT

A disposable complete filtration apparatus constructed from a filter means and flexible impermeable film joined together in such manner as to form fluid receptacles for the filtrant and filtrate, said receptacles being connected internally to one another by said filter means. Being preformed, the apparatus requires no assembly by the user. Moreover, by lying flat it occupies negligible space before use and can be dispensed from a roll or stack, yet being flexible it dilates or contracts to accept the sample to be filtered and accomodates the movement of fluid during filtration. In one embodiment the filter means will trap microorganisms and the receiver contains a drinking tube which allows the user to enjoy microbiologically pure water. Chemical or biochemical test reagents may be incorporated into the apparatus so that simple tests requiring filtration and addition of test reagents can be performed automatically.

10 Claims, 7 Drawing Figures

Figure 1b
Figure 1a
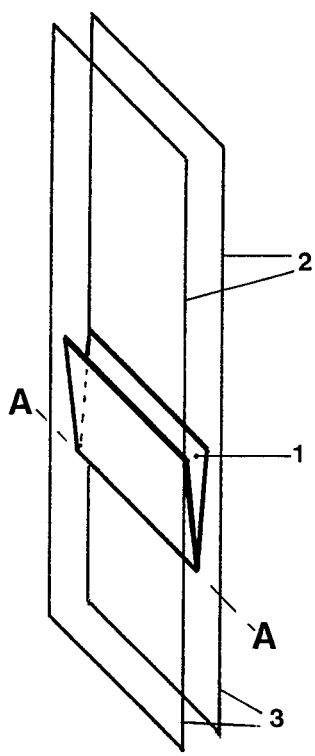
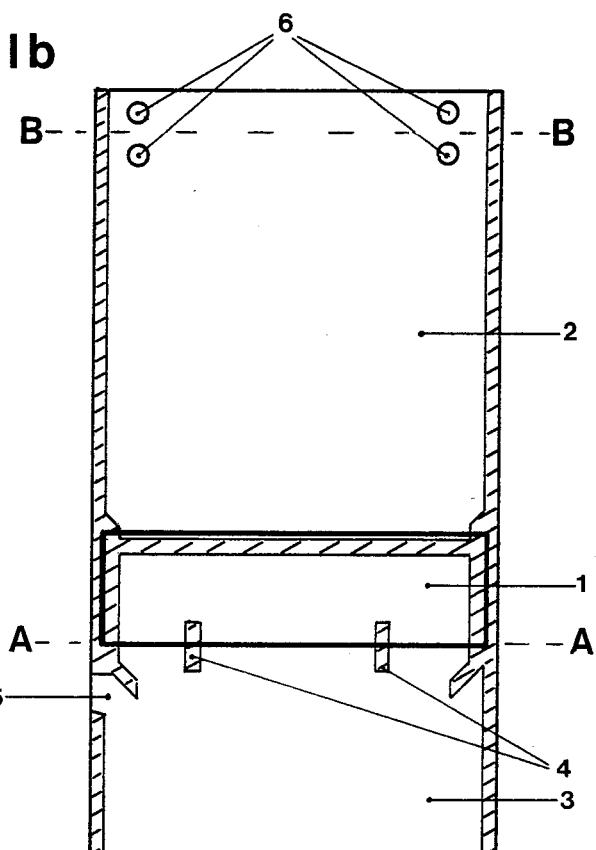
Figure 2b
Figure 2a
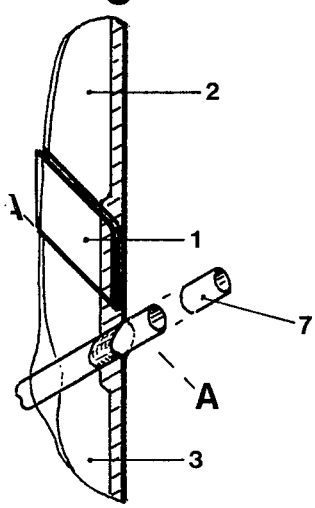
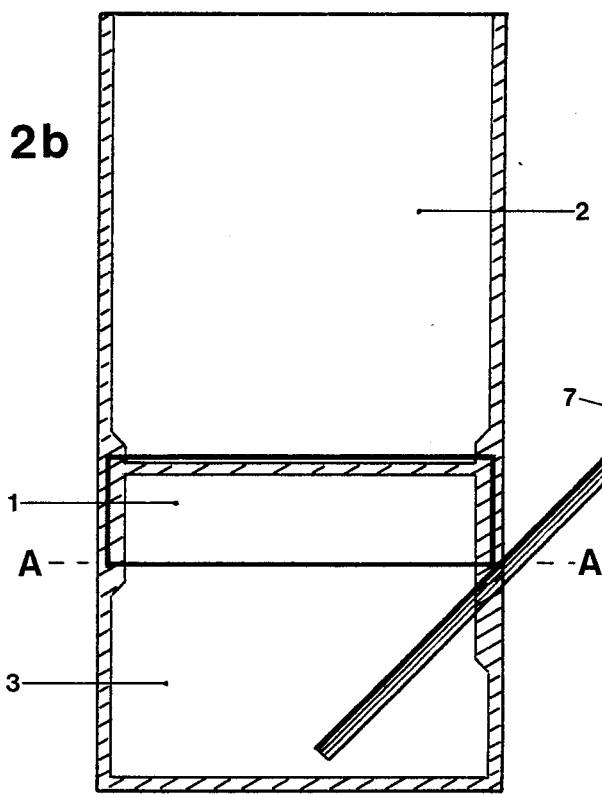

APPARATUS FOR FILTRATION

BACKGROUND TO THE INVENTION

The invention is concerned with apparatus for filtration of fluids and of carrying out chemical or biochemical analyses requiring prior filtration of fluids.

In one of the commonest laboratory techniques a suspension of solid particles in liquid is separated out by filtration. In its simplest form the filtration is brought about by folding a disk of filter paper into a cone, fitting the cone into a rigid conical filter funnel and inserting this in a flask which is the receiver for the filtrate. More complex apparatus may require elaborately constructed filter means, filter supports, vacuum or pressure pumps and valves. After filtration is complete the apparatus is normally readied for re-use by disassembling it and washing or sterilizing the individual parts. The storage or bench space required for adequate numbers of apparatus and the labour required to assemble and wash them can be considerable. Other disadvantages of this common technique are that the apparatus (being often made of glass) is easily broken, it can be knocked over easily, and unless special fume hoods are available volatile solvents may give off flammable or toxic fumes. Labeling on filters or receivers must be carefully removed in order to avoid confusion when the apparatus is re-used. When biological materials are handled inconvenient precautions are needed to prevent airborne microorganisms contaminating the material being filtered.

A frequent hazard experienced by travellers, campers and survivors of earthquakes etc, is the presence of pathogenic microorganisms in the drinking water. These organisms can be removed by filtration. However, it is rarely practicable to carry or store a bulky filtration apparatus. Many instances of illness ensuing from the drinking of contaminated water might be avoided if a lightweight and portable filtration apparatus were available. Occupants of lifeboats to whom only salt water is available would similarly benefit if a lightweight, portable desalination apparatus were available.

A related problem occurs in many procedures for chemical or biological analysis, where it is necessary to filter the fluid sample before adding the test reagents. For example, it may be difficult to measure the acidity of a soil suspension or lake water by means of a colour sensitive indicator unless the sample is first clarified. In addition to the labour required to perform the filtration, labour is also required to make up solutions of the test reagents and dispense them.

I have realized that the weight and the space normally taken up by the components of filter assemblies, the work involved in fitting them together and of cleaning them, and the making up and adding of chemical reagents are major problems to be overcome in many types of filtration work and in providing local supplies of potable water. It is important to the appreciation of my invention to understand that a complete filtration apparatus comprises three functional elements, namely, the filter means itself, and receptacles for both the fluid to be filtered and the filtered fluid (functionally equivalent to the aforementioned funnel and receiver), said receptacles being capable of holding the whole volume of fluid until such time as it is put to further use. Many inventions claimed to be filtration apparati are not, in fact, complete.

Accordingly, my invention provides a lighweight and self-contained preformed filtration apparatus of insignificant volume when not being used, comprising a filtration means such as a paper or cloth or membrane filter, and two sheets of flexible film or one sheet of said film folded double, said components being joined together in such a way that compartments functionally equivalent to the aforementioned funnel or receiver are formed from the film but are connected to one another internally by said filter means.

My invention also provides for said receiver to be formed in such a way that an orifice is available either directly or only after cutting off a piece of the film, or else it contains a drinking tube or straw through which the filtered fluid may be sucked without need to tilt the apparatus. In each of these cases filtrate may be removed without need to first remove the remainder of the suspension being filtered.

My invention also provides for a filtration apparatus in which the fluid may be isolated from aerial contamination by simply folding the flexible top, and which, when in use, may be suspended from its upper end by means of hooks, wires or other suspending means, so that it may conveniently be suspended from a wall-rack at the side of the work area, rather than standing on a bench.

My invention also provides for indicators of various chemical or biochemical properties (for example, pH, Redox value, etc) to be sealed into one or more of the compartments if so desired, so that tests for these properties can be made automatically on the suspension or filtrate.

My invention also provides for a plurality of filtration compartments to be formed together, with successive filter means of different porosities and with different chemical or biochemical test reagents sealed in or between each receiver, so that a liquid poured into the funnel undergoes successive chemical reactions as it passes through the compartments.

Such apparatus for filtration or chemical analysis being made of flexible material can be stored flat in large numbers in a small space, either lying on top of one another, or removably attached to one another as, for example, on a continuous roll from which single units may be removed by tearing along a perforation. Thus it considerably alleviates the bulk and storage problems associated with carrying out large numbers of filtrations. It is important to note that while the funnel and receiver in my apparatus have no internal volume until the apparatus is put into use, these elements are each and individually capable of holding the whole volume of fluid which is to be filtered, and that being flexible they dilate or contract as necessary to accomodate the addition of fluid to the apparatus and the movement of fluid through it as it passes through the filter means under the influence of gravity.

To use the apparatus the funnel compartment is held open, for example, by thumb and forefinger and the fluid to be filtered is poured in. The flat flexible receiver dilates automatically as the filtrate runs into it and the funnel collapses as it empties. In the apparatus for carrying out chemical or biochemical analyses the reagents dissolve in or disperse in the filtrate from each preceeding compartment and yield colours, precipitates or other reactions according to the known laws of science.

The apparatus can be hung in any convenient space by means of a clip, hook or wire, and these may even be fabricated into the apparatus. However, the actual means of suspension is not critical. In addition, the apparatus can be sealed temporarily by folding over the top of the funnel compartment. Thus it conveniently eliminates the possibility of airborne microorganisms contaminating the fluids, or prevents the release of flammable or toxic vapours. After use the apparatus can be discarded, thereby eliminating the need for washing or removing identifying codes.

When said filter means is of a quality such as to remove pathogenic microorganisms or is a membrane impermeable to dissolved salts my invention provides a lightweight and portable source of potable water. For example, it may be carried folded in a backpack then filled with impure water and hung from the frame of a tent. In one embodiment a drinking straw or tube may be sealed into the receiver so that the user can withdraw purified water as necessary.

My invention thus provides a complete filtration apparatus which enables filtrations or analyses to be carried out immediately, without the need to assemble filter paper, funnel and receiver, or to add test reagents, whereas previously these were required to be stored separately and to be brought together before use, and to be washed out again where necessary after the filtration. This simplifies and speeds up the process and can reduce labour costs.

SUMMARY OF THE INVENTION

Apparatus in accordance with the invention will in the preferred form be constructed from conventional filter means such as paper, cloth, cellulose acetate or other cohesive porous sheet, and flexible single-ply or laminated plastic film of a type that is easily joined by welding or gluing and of a quality suited to the use to which the assembly is to be put. Once familiar with the general principles of construction of the apparatus as described herein the method of bringing together the components and of joining them together by welding will be obvious to anyone skilled in the art of making plastic bags and similar articles. In its simplest form the filter means is not folded before being sealed into the apparatus; however, if it is folded double and sealed in with the crease at the bottom so that the crease intersects the direction of fluid movement, as shown in the drawings, the mechanical strength of the apparatus is considerably improved.

Figure 4A:
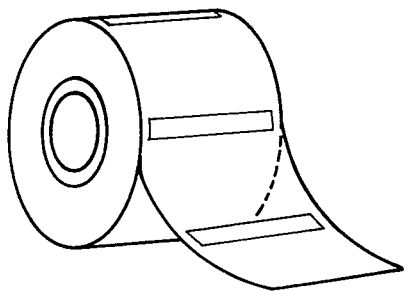
Figure 4B:
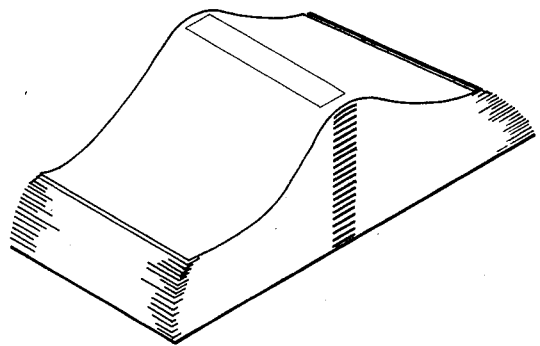

Four embodiments of the invention will now be described by way of example with reference to the accompanying diagrammatic drawings in which:

FIG. 1a is a perspective view showing the relation of the folded filter means and two plastic sheets before assembly, and FIG. 1b shows the side elevation of a complete filtration apparatus in the preferred form in which the filter means is folded double, FIG. 2a perspectively shows a detail of the assembly around the entry point of a straw and FIG. 2b the side elevation of this filtration apparatus in which the receiver contains a drinking straw, FIG. 3 shows an apparatus containing indicators of various chemical properties and a plurality of compartments in which precipitation and filtration can occur, FIGS. 4a and 4b show a plurality of such apparatus for filtration or chemical or biochemical analysis, illustrating how they can be stored on a roll or in boxes.

Referring to FIGS. 1a and 1b, the filter means 1 is preferably a folded rectangular filter paper, cloth or membrane, the size and aspect ratio of said rectangle not being critical but preferably being chosen to suit the use to which the apparatus will be put. For example, if the apparatus is expected to filter out voluminous precipitates the aspect ratio may be such that the folded filter means is as tall as, or even taller than it is wide. If the apparatus is expected to filter out only small volumes of precipitate it will be more economical to choose a filter means for which the height is small in relation to the width. In general, wider filter means will be chosen for filtration of larger volumes of fluid. While the preferred shape is a rectangle other shapes are not excluded. For example, a regular or symmetric hexagon before folding may be used, but may provide less efficient filtration and be more difficult to fabricate. Likewise, while the filter means is preferably folded double and preferably oriented so that the crease will be downwards and intersecting the direction of fluid flow when the apparatus is used other folds and orientations are not excluded.

Said filter means 1 is folded along the line A—A and inserted between two sheets of impermeable, flexible single-ply or laminated plastic film or a single sheet of said film folded double. The two sheets of film are then joined together and to the outer surfaces of filter means 1 at the places indicated by the shaded area in FIG. 1b. The joining may be brought about by means of conventional thermal or ultrasonic welding, whereby the components are compressed between the opposed faces of welder dies shaped according to the shape of said shaded area. Alternatively, said sheets of film may first have applied to them by printing means a suitable fusible or solvent-based adhesive before being brought together around said filter means and bonded, for example, by being passed between opposed heated rollers.

It will be seen that, in a filtration apparatus constructed according to this description, receptacles (funnel 2 and receiver 3) capable of holding the whole volume of fluid to be filtered are fabricated in one step and that although they are at this stage lying flat and have no internal volume thay will be capable of flexibly dilating to accept the fluid poured into the apparatus as it passes through under the influence of gravity. It will also be seen that the filter means separates but internally connects the funnel 2 and receiver compartment 3 and is the only route by which fluid can pass from one to the other. The small joins 4 are optional and may be added to provide extra support for the filter means if the apparatus is very large. An optional hiatus in the otherwise continuous join provides an outlet 5 which allows filtrate to be poured out of the receiver. Alternatively, the join may be made continuous at 5 so that the receiver is completely sealed unless an orifice is made by cutting the plastic film. The dimensions of the apparatus are relatively unimportant but are preferably chosen so that the volume of the receiver is at least as large as the volume of the funnel.

The apparatus may be fabricated either with or without regard for the means by which it will be suspended when in use since almost any suspension means will be acceptable and will, in any case, depend on the type of support structure (hook, nail, rail, clothes-line, tent-frame, tree, etc) available. For example, two sets of holes 6 may be provided so that the funnel top may be folded along the line B—B and the apparatus hung from hooks. Alternatively, the holes may be omitted so that the apparatus may be hung up by a clip or pins, but any other method of sealing and hanging such as a pliant wire or plastic closure combined with a handle is not excluded. Whatever method is used, it will be seen that the funnel is sealed from minor upsets and the entry of microorganisms or escape of volatile solvent is minimized.

Referring to FIGS. 2a and 2b, an apparatus containing a drinking straw or other tube 7 sealed into the receiver is shown. The numbers 1–6 have the same meaning as in FIG. 1. To fabricate the apparatus the tube 7 is simply inserted between the plastic sheets at a suitable angle and distance from the crease of filter means 1 and becomes sealed in place when the components are all joined together. The tube 7 is preferably of a cross-section and flexibility that will allow it to be stored flat with the rest of the apparatus, or it may be a more rigid tube around which the apparatus is wrapped until use, but other forms and arrangements are not excluded. The tube may also be sealed until use by a removable cap or cuttable tip so that the entry of airborne microorganisms is prevented until such time as fluid is withdrawn.

Referring to FIG. 3, a more complicated apparatus is shown in which certain chemical test compartments and two filters are constructed. The numbers 1–6 have the same meaning as in FIG. 1 and the suffixes a and b refer to the repeated components of the apparatus, which these may be repeated as many times as is necessary. Each receptacle 3a, 3b etc., is of a volume sufficient to hold the whole volume of fluid being filtered, so that even if one filter means becomes impermeable to the filtering fluid filtration will be completed through all of the stages above it. The porosities of the various filter means will not necessarily be in a graded series but will be chosen so as to be appropriate to the nature of any precipitate formed in the receptacle above it by reaction of fluid with the reactant sealed therein. This apparatus is useful for carrying out tests for certain chemical or biochemical properties and by varying the number of compartments and the reactants therein a number of analytical schemes are possible. The test reagents may be inserted as pieces of impregnated paper as shown, or as powders, or in specially formulated inks which are printed onto the plastic film or the filter paper before the apparatus is sealed together. Very many combinations of tests are possible and the reagents and their quantities and method of retainment in the apparatus must be chosen according to the use to which the apparatus is to be put. To use the apparatus a solution or suspension is poured into the funnel 2 and passes through the first filter 1a into receiver 3a where it reacts with indicator 8 which may be, for example, lead acetate which forms a black precipitate in the presence of sulfide. The filtrate passes through filter 1b into receiver 3b where it reacts with indicator 9 which may be, for example, silver nitrate which forms a characteristic precipitate in the presence of chloride, bromide or iodide. It should be noted that this apparatus carries out automatically and without effort a series of tests which previously required a considerable amount of manipulative time.

Referring to FIG. 4a, large numbers of such apparatus can be stored on a roll from which units can be removed by tearing along a perforation or by pulling them from a backing sheet to which they are attached. Alternatively, large numbers of the apparatus can be stacked above one another as in FIG. 4b.

I claim:

1. A complete filtration apparatus comprising filter means and flexible impermeable film welded or adhesively joined together in such a way that receptacles for the whole volumes of both the fluid to be filtered and the filtered fluid are formed from said film, said receptacles being internally connected with one another solely by said filter means, said receptacles also being initially flat and of minimum internal volume before use but being capable of flexibly dilating or collapsing to accommodate the addition of fluid and its movement through the apparatus under the influence of gravity and also of holding the filtered fluid until such time as it is removed for further use.

2. A filtration apparatus as in claim 1, in which said filter means is rectangular and is folded double and joined with said flexible film in such manner that during use its crease intersects the general direction of fluid movement.

3. A filtration apparatus as in claim 1, in which the receptacle for filtered fluid is sealed completely against fluid loss so that filtrate cannot be removed unless said receptacle is pierced.

4. A filtration apparatus as in claim 1, in which the receptacle for filtered liquid is left partially unsealed so that filtrate can be poured out.

5. A filtration apparatus as in claim 1, in which the filter means is capable of trapping pathogenic bacteria or other microorganisms.

6. A filtration apparatus as in claim 1, in which the filter means is capable of trapping pathogenic bacteria or other microorganisms and in which the receiver has sealed into it a tube or straw through which microbiologically purified water may be withdrawn.

7. An apparatus as in claim 1, comprising a plurality of flexible receptacles each capable of holding the whole volume of the fluid to be filtered, said receptacles being individually or severally connected by filter means, and in which the various receptacles also contain indicators of the chemical or biochemical properties of the fluid which is to be filtered.

8. An apparatus as in claim 1, in which a plurality of said apparatus are stored removably attached to one another on a roll or folded pile.

9. A filtration apparatus as in claim 1, in which the filter means is a semi-permeable membrane capable of separating water and salt by the process known as reverse-osmosis.

10. A filtration apparatus as in claim 9, in which the receiver has sealed into it a tube or straw through which desalinated water may be withdrawn.

* * * * *